Patented Sept. 6, 1938

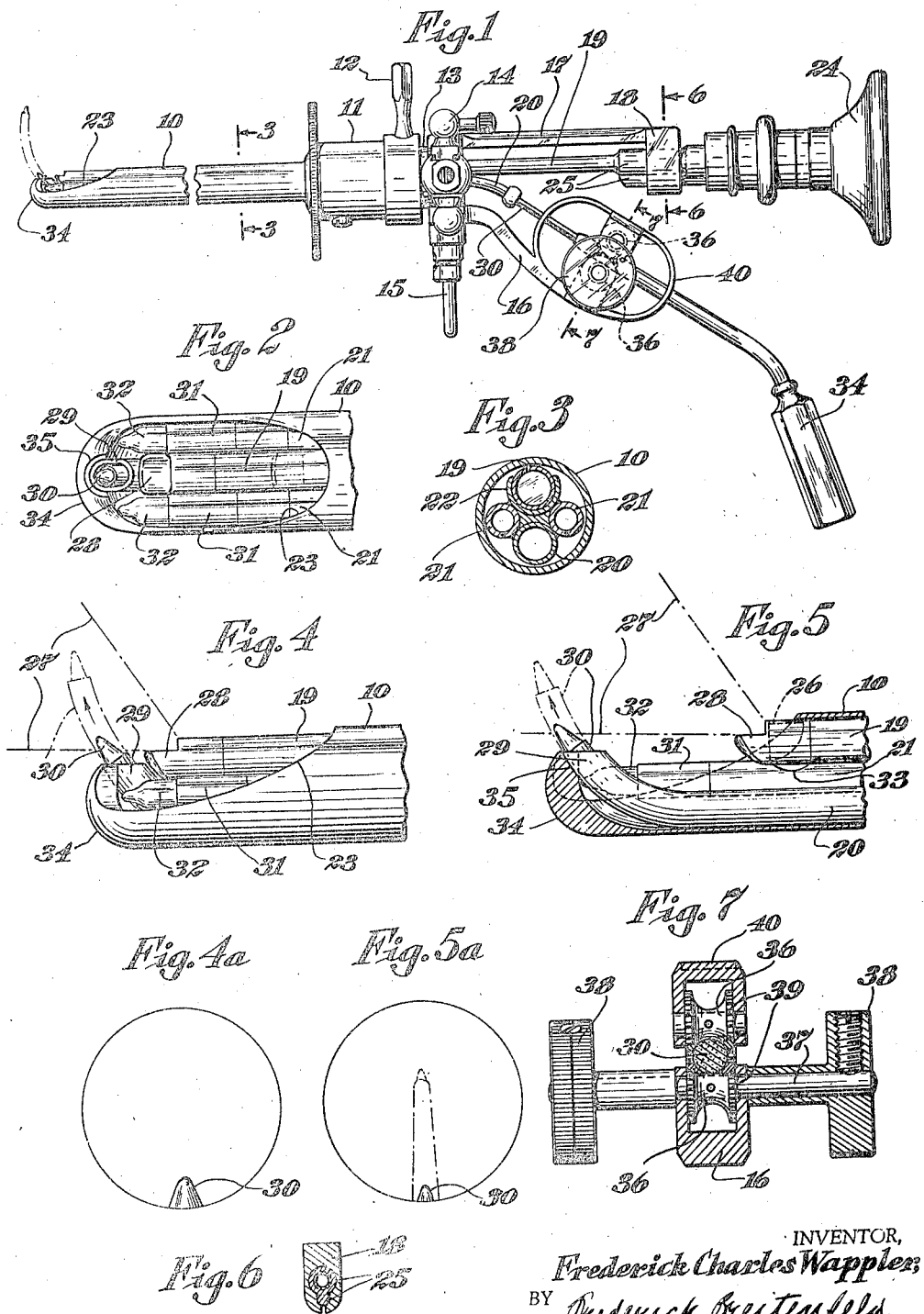

2,129,391

UNITED STATES PATENT OFFICE 2,129,391

ENDOSCOPIC INSTRUMENT

Frederick Charles Wappler, New York, N. Y.

Application April 9, 1936, Serial No. 73,441

5 Claims. (Cl. 128—6)

My present invention relates generally to endoscopic instruments, and has particular reference to an improved assembly of elements to facilitate the manipulation of catheters, electrodes, and similar tools.

It is a general object of my invention to provide an instrument whose employment permits an operator, with greatly enhanced facility, to accurately control the movements of an advancing catheter or similar tool under illuminated vision.

One of the features of the invention lies in the provision, in combination with a telescope which commands a forwardly oblique field of vision, of a tool-guiding tube whose outlet end is positioned in front of the telescope objective but, nevertheless, alongside of the field of vision. The assembly is such that the telescope may be longitudinally shifted so as to advance its objective, or retract it, with respect to the outlet end of the tool-guiding tube. Preferably, the outlet end of the tube is positioned in the path of movement of the telescope so that it serves as an abutment for the telescope when the latter is advanced to its fullest extent.

Another feature of the construction lies in the provision of at least one lamp, and preferably two lamps, closely adjacent to and alongside of the outlet end of the tool-guiding tube. In a preferred construction, two lamps are employed and they lie alongside of the outlet end on opposite sides of the latter, respectively. This positions the lamps in front of the telescope objective, but they are so arranged that they lie outside of the field of vision.

A further feature lies in the provision of supporting tubes for the lamps, each tube being adapted to serve simultaneously as an irrigation conduit.

The present improved instrument includes also a novel form of tool-advancing mechanism which permits the operator through the medium of a hand-wheel to accurately control the advancing and retracting movements of the tool. This feature of the invention is, from certain aspects, an improvement which is independently useful with almost any kind of similar instrument by means of which a tool is intended to be longitudinally actuated.

I achieve the foregoing objects, and such other objects as may hereinafter appear or be pointed out, in the manner illustratively exemplified in the accompanying drawing, wherein—

Figure 1 is a side view of an instrument embodying the features of the present invention, the midportion of the sheath being broken away for the sake of compactness in illustration;

Figure 2 is a greatly enlarged view of the forward end of the instrument of Figure 1 taken from the top of Figure 1, i. e., looking directly into the fenestra;

Figure 3 is a cross-sectional view taken substantially along the line 3—3 of Figure 1;

Figure 4 is an enlarged view of the forward portion of the instrument taken in the same direction as Figure 1, showing the telescope in its fully advanced position;

Figure 4A is a depiction of the view that may be obtained through the telescope when the parts are in the relationship of Figure 4;

Figure 5 is a view similar to Figure 4, showing the telescope in a retracted position, the sheath being in this view shown in cross-section;

Figure 5A is a view similar to Figure 4A, depicting the view that may be obtained through the telescope when the parts are arranged as in Figure 5;

Figure 6 is a cross-sectional view taken substantially along the line 6—6 of Figure 1; and Figure 7 is an enlarged cross-sectional view taken substantially along the line 7—7 of Figure 1.

An elongated, substantially circular sheath 10 is provided at its rear end with the usual coupling sleeve 11 and the locking ring 12. The operative elements of the instrument are arranged in the form of a bundle projecting forwardly from a plug 13 which fits into the sleeve 11 in a removable manner. The plug carries petcocks 14 (only one is shown in Figure 1, but a similar petcock projects from a diametrically opposite point not visible in Figure 1), an electric connection terminal 15, a bracket 16, and a rearwardly extending bracket 17. At its rear end, the bracket 17 carries a sleeve-like member 18 which serves as a guide for the telescope tube 19.

The bundle of elements, the forward ends of which are shown most clearly in Figure 2, consists of a tube 20, serving as a tool-guiding tube, a pair of tubular conduits 21, a guide channel 22, and the telescope tube 19. These elements are arranged substantially as shown in Figure 3, each of the conduits 21 being arranged alongside of the tube 20 on opposite sides of the latter, respectively. The tube 20, the conduits 21, and the guide channel 22 are rigidly secured together. The telescope tube 19 is slidably mounted within the channel 22.

The forward end of the sheath 10 is provided with a substantially oblique fenestra 23, and the elements are adapted to be inserted into the sheath with the tool-guiding tube 20 arranged along the long wall of the sheath, the telescope 19 thereby positioning itself along the short wall of the sheath.

The telescope contains within it suitable spaced lenses (not shown), transmitting a view, in wellknown manner, to a rear eyepiece 24. A short distance in front of the eyepiece 24 the tube 19 has the somewhat enlarged, non-circular portion 25 which is adapted to fit into a correspondingly shaped bore in the member 18. This association of parts permits the telescope 19 to be shifted longitudinally, and prevents rotational movements of the telescope during this shifting.

At its forward end the telescope has an eccentric objective lens 26, substantially of the character illustrated and described in United States Letters Patent No. 1,680,491, this lens serving to command a forwardly oblique field of vision. This field is substantially conical, as indicated by the dot-and-dash lines 27 of Figures 4 and 5, and it will be observed that the apex of the cone passes into the thicker portion of the lens 26. The term "forwardly oblique", as it is used herein and in the appended claims, in referring to the field of vision of the telescope, is intended in each case to designate a substantially conical field of the character hereinbefore described.

Mounted over the front of the objective 26, i. e., over the major portion of the lens but, nevertheless, alongside of the field of vision, is a visor element 28 having a substantially oblique forward surface.

The forward or outlet end 29 of the tube 20 is curved into a position in front of the objective 26, as shown most clearly in Figures 4 and 5, but this outlet end, nevertheless, is arranged alongside of the field of vision of the telescope. Accordingly, when a flexible tool, such as the electrode 30, emerges from the guide tube 20 it enters directly into the field of vision. When the telescope is advanced, as shown in Figure 4, the objective is almost on top of the tool 30, and the latter looms relatively large in the field of vision, as shown most clearly in Figure 4A.

The advancing movement of the telescope is limited by the encounter of the visor element 28 with the outlet end 29 of the tube 20.

Mounted on the forward end of each of the conduits 21 is a lamp socket 31 carrying a lamp 32. The arrangement of these lamps on opposite sides, respectively, of the outlet end 29 is shown most clearly in Figure 2. It will be observed that the lamps lie in advance of the telescope objective, but well out of the field of vision. Thus, an efficient illumination of the field is effected without impairing visibility. The visor portion 28, while preferable, is not absolutely essential because in no event does the field of vision encompass the lamps within its scope.

The electrical connections for the lamps extend through the walls of the conduits 21 and communicate at the rear end with the electrical terminal 15.

The rear ends of the conduits 21 communicate with the petcocks 14, in wellknown manner, and near the forward ends, i. e., slightly behind the lamp sockets 31, each of them is provided with an outlet opening. One of these openings is shown in Figure 5 and designated by the reference numeral 33.

In the preferred construction illustrated, the forward end of the sheath 10 is rounded, as shown at 34, this rounded end serving to shield the lamps 32 and having at its midportion a groove or seat 35 within which the outlet end 29 accommodates itself when the instrument is in use.

The advantages of the present instrument will be understood by those skilled in the art. The ability to advance the telescope close up to the emerging tool 30, as the latter enters the field of vision, greatly facilitates the ability of the operator to aim the tool accurately into a desired direction, e. g., against a predetermined spot area, or toward and into a constricted body channel, such as the ureter. The fact that the operator may then, with great ease, withdraw the telescope rearwardly, e. g., into the position of Figure 5, makes it possible for the operator to obtain a better perspective of the entire surrounding area within which he is operating and into which he is directing the tool. This enlarged visibility will be obvious upon a comparison of Figures 4 and 5, and is also indicated in Figure 5A. The ability to keep the tool constantly visible, under illumination, and with the aid of irrigation, contributes also to the usefulness of the device.

The rear end of the tool-guiding tube 20 is slightly inclined, as shown in Figure 1, and I have illustratively shown the rear end 34' of the tool 30, in the form of a handle. In front of this handle the shaft of the tool is preferably a little thicker than the main portion of the tool. In order to facilitate the control of the tool I provide on the bracket 16 an elliptical element 40 of spring metal. Journaled in opposite portions of this element are the complementary rollers 36, 35 arranged side-by-side and adapted to frictionally engage the tool 30 between their peripheral surfaces, as indicated most clearly in Figure 7. On the shaft 37 of one of the rollers I mount a pair of hand-wheels 38, and I provide intermeshing gear teeth 39 on the rollers, preferably as integral portions thereof.

The element 40 is so bowed that it yieldably resists extension of the minor axis of the ellipse which it defines. Accordingly, the rollers 36 are constantly yieldably pressed together, the gear teeth 39 being of sufficient length to permit this yieldable movement of the rollers toward and away from each other. Accordingly, the tool 30 is frictionally engaged between the rollers, and by merely rotating either one of the hand-wheels 38 the operator is enabled in an accurately controllable manner to cause advancements and retractive movements of the tool.

While I have illustratively shown the present instrument in association with a tool of the electrode type, nevertheless it will be understood that the invention is not restricted to any specific tool or mode of procedure or treatment. Accordingly, the term "tool", as used in the appended claims, is intended to refer generally to any flexible tool such as a catheter or the like.

In general, it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limting sense.

Having thus described my invention, and illustrated its use, what I claim as new and desire to secure by Letters Patent is—

1. In an instrument of the character described, a telescope having an objective which commands a forwardly oblique field of vision, a tool-guiding tube, a pair of irrigation conduits alongside of said tube on opposite sides of the latter, respectively, and a pair of lamps mounted on the forward ends of said conduits, respectively, and adjacent to the outlet end of said tube, said lamps and outlet end being positioned in front of the objective but alongside of the field of vision.

2. In an instrument of the character described, a device for advancing a flexible tool such as a catheter, comprising a fixed bracket, an element of spring metal carried by said bracket and bowed to form spaced portions yieldably resisting separation, a pair of complementary rollers journaled in said portions, respectively, and adapted to frictionally engage the tool between their peripheral surfaces, and a handwheel for rotating one of said rollers.

3. In an instrument of the character described, a device for advancing a flexible tool such as a catheter, comprising a fixed bracket, an element of spring metal carried by said bracket and bowed to form spaced portions yieldably resisting separation, a pair of complementary rollers journaled in said portions, respectively, and adapted to frictionally engage the tool between their peripheral surfaces, a handwheel for rotating one of said rollers, and intermeshing gears carried by said rollers.

4. In an instrument of the character described, a device for advancing a flexible tool such as a catheter, comprising a fixed bracket, an element of spring metal carried by said bracket and bowed to form spaced portions yieldably resisting separation, a pair of complementary rollers journaled in said portions, respectively, and adapted to frictionally engage the tool between their peripheral surfaces, and a handwheel for rotating one of said rollers, said spring metal element comprising an integral elliptical element resisting extension of its minor axis.

5. In an instrument of the character described, an elongated sheath having an oblique fenestra at its forward end, and a bundle of elements removably accomodated within said sheath, said bundle comprising a telescope arranged along the short wall of the sheath and having an objective which commands a forwardly oblique field of vision through said fenestra, a tool-guiding tube arranged along the long wall of the sheath with its outlet end positioned directly in front of the telescope objective but alongside of the field of vision, an irrigation conduit alongside of said tube, and a lamp mounted on the forward end of said conduit adjacent to the outlet end of said tube and also alongside of the field of vision.

FREDERICK CHARLES WAPPLER.